United States Patent

[11] 3,628,038

[72] Inventors Irven H. Culver
Playa Del Rey;
Ronald C. Sheltra, West Los Angeles, both of Calif.

[21] Appl. No. 868,436
[22] Filed Oct. 22, 1969
[45] Patented Dec. 14, 1971
[73] Assignee Southwestern Industries, Inc. Los Angeles, Calif.

[54] PHOTOELECTRIC CHOPPER FOR DISTANCE MEASUREMENT
16 Claims, 8 Drawing Figs.

[52] U.S. Cl. ........ 250/233, 250/237 G
[51] Int. Cl. ........ G01d 5/36
[50] Field of Search ........ 250/233, 237 G; 33/141

[56] References Cited

UNITED STATES PATENTS

| | | | |
|---|---|---|---|
| 2,788,519 | 4/1957 | Caldwell | 250/233 X |
| 3,187,187 | 6/1965 | Wingate | 250/233 X |
| 3,193,744 | 7/1965 | Seward | 250/233 X |

*Primary Examiner*—James W. Lawrence
*Assistant Examiner*—D. C. Nelms
*Attorney*—Christie, Parker & Hale

ABSTRACT: A distance-measuring system is described in which a wheel is frictionally engaged with a surface along which measurements are made. The metering wheel is connected to a shaft which drives a portion of a photoelectric chopper which provides an indication of increments of metering-wheel travel. The chopper includes a disk on the shaft with a plurality of windows alternating with opaque areas in a circular path near the periphery of the disk. A mask having an arc of somewhat similar windows is adjacent and spaced a short distance away from the disk. A pair of lights and a pair of photosensors are located on opposite sides of the mask-disk set. Each photosensor detects light passing through a different plurality of windows in the mask and disk and, as the disk rotates, a substantially symmetrical variation in light intensity occurs. A minimum area noncollimated light source is provided and the mask is located nearer the light source than is the disk. A greater number of windows per unit length is provided on the mask than on the disk so that successful chopping of a noncollimated light beam is obtained when the mask and disk are spaced apart. The mask is mounted on a ring movably by an eccentric and constrained to move only angularly about its center and along a direction normal to a chord between the two photosensors. This permits the phase relation between the photosensor inputs to be adjusted readily and with high precision. Precise adjustment of phase relation and proper mask and disk construction permit the chopper to give usable signals at very high slue rates.

INVENTORS.
IRVEN H. CULVER
RONALD C. SHELTRA
BY
Christie, Parker & Hale
ATTORNEYS.

PHOTOELECTRIC CHOPPER FOR DISTANCE MEASUREMENT

FIELD OF THE INVENTION

Broadly, this invention is in the field of optical encoders. More particularly, it is in the field of automatic encoding of the position of the output shaft of a measuring device having a rotatable metering wheel.

BACKGROUND

Machinists now have commercially available to them various rotary wheel, linear measurement devices. One such device is a friction wheel measurement instrument which is mountable directly on a machine tool for faithfully tracking relative movement between two parts of the tool and for accurately and precisely indicating the extent of such relative motion for visual observation Such an instrument includes a housing in which is mounted a rotatable, smooth-surfaced metering wheel which projects beyond an edge of the housing. The instrument is mounted to a lathe carriage, for example, so that the metering wheel engages a portion of the lathe bed. As the carriage is moved along the lathe bed the metering wheel rolls faithfully without slippage along the surface solely by reason of frictional engagement of the metering wheel with the surface.

The instrument housing includes a rotatable shaft which is continuously coupled to the metering wheel so that the shaft rotates in response to and in direct proportion to rotation of the metering wheel at a rate at least as great as that of the metering wheel. In the most common such commercial device a motion-amplifying gear train is present between the metering wheel and the shaft, and the shaft is connected to a dial indicator mounted on the housing. The indicator continuously displays the travel of the metering wheel along the measurement surface and is calibrated in small fractions of an inch, preferably thousandths of an inch, of travel of the metering wheel relative to the measurement surface.

Instruments of the type described above have such repeatable accuracy when properly mounted that they are incorporated into several commercially available product inspection devices and coordinate-measuring devices. Such instruments per se are manufactured and sold by Southwestern Industries, Inc., Los Angeles, Calif. Instruments of this type are described and illustrated in U.S. Pat. No. 3,311,985 entitled Friction Wheel Measuring Apparatus, by M. E. Hodge, and U.S. Pat. No. 3,378,929 entitled Measuring Device, by C. E. Deardorff et al.

Measuring instruments of the type described above commonly have a measurement-indicating capacity equal to the circumference of the metering wheel. Accordingly, reading of the instrument for distance measurements necessitating plural rotations of the metering wheel requires that a count be made of the number of times the metering wheel rotates, or that the approximate distance travelled be known beforehand. A simple mental calculation is made to obtain a base to which the actual reading of the instrument can be added to obtain the exact distance travelled. Mental computations and arithmetic operations should be avoided because, no matter how simple they may be, they are sources of errors; and errors in machining operations, particularly in precision machining operations, can be quite costly.

The measuring instruments referred to in the preceding discussion have the feature that they are sufficiently compact that they may be installed at essentially any desired location along the way or guide surface of a machine tool. While this results in considerable flexibility in the permissible mounting location of the instrument it is still necessary that the instrument be mounted along a way or guide surface. As a result the instrument must usually be located some distance from the location on the lathe or the like where the machining operation is performed and which should receive the machinist's full attention. For most efficient use by a machinist the instrument should be readable at a point spatially close to the location where the actual machining operation is performed.

For these reasons, friction wheel measuring devices of the type described above have been provided with remote measurement indicating display units which are mountable close to the location where machining operations, for example, are performed and which are driven and controlled by signals derived from the instrument. Such signals are derived from a signal generator, commonly on electrooptical signal generator, associated with the instrument shaft and are applied to drive a bank of numeric display tubes (for example, Nixie tubes) or the like in the remote display unit. Such electronic sensing of instrument shaft rotation permits automatic accumulation of position so that substantial distances can be measured without mental computation. The display capacity of the remote display unit is conventionally several times the circumference of the metering wheel. It will be apparent that once the shaft position is obtained as an electronic signal many types of conventional equipment can be employed for providing a large number of measurement and control functions.

The signal generator must have some element coupled to a shaft in the measuring instrument. However, significant problems of mass, inertia, spacing, and alignment are encountered in providing a reliable, rugged, and economical, precision electrooptical signal generator. It is therefore desirable to provide a signal generator that is readily built, and adjusted and occupies a minimum space and has light weight. It is also desirable to have a measuring instrument capable of operating accurately at high rates of metering wheel rotation, and therefore any signal generator usable with such an instrument must be capable of generating usable signals at high rates. The rate of shaft rotation is commonly known as the slue rate. Precise positioning of the mechanical components of the signal generator is desirable if usable signals are to be produced at high slue rates.

BRIEF SUMMARY OF THE INVENTION

Thus, in practice of this invention according to a preferred embodiment there is provided a photoelectric chopper having a pair of masks with a plurality of alternating transparent and opaque regions. One of the masks rotates relative to the other. These masks are arranged adjacent a noncollimated light source and a greater number of windows are provided per unit length in the mask nearer the light source than in the mask further from the light source so that successful chopping of noncollimated light is obtained. In order to adjust the phase relation between separate areas of adjacent windows in the two adjacent masks means are also provided for moving one mask relative to the other mask in one direction of translation and preventing translation in a direction normal to the first direction.

DRAWINGS

The above-described and other features and advantages of this invention will be apparent as the same becomes better understood by reference to the following detailed description of a presently preferred embodiment when considered in connection with the accompanying drawings wherein.

Throughout the drawings like numerals refer to like parts.

DESCRIPTION

Figure 1:
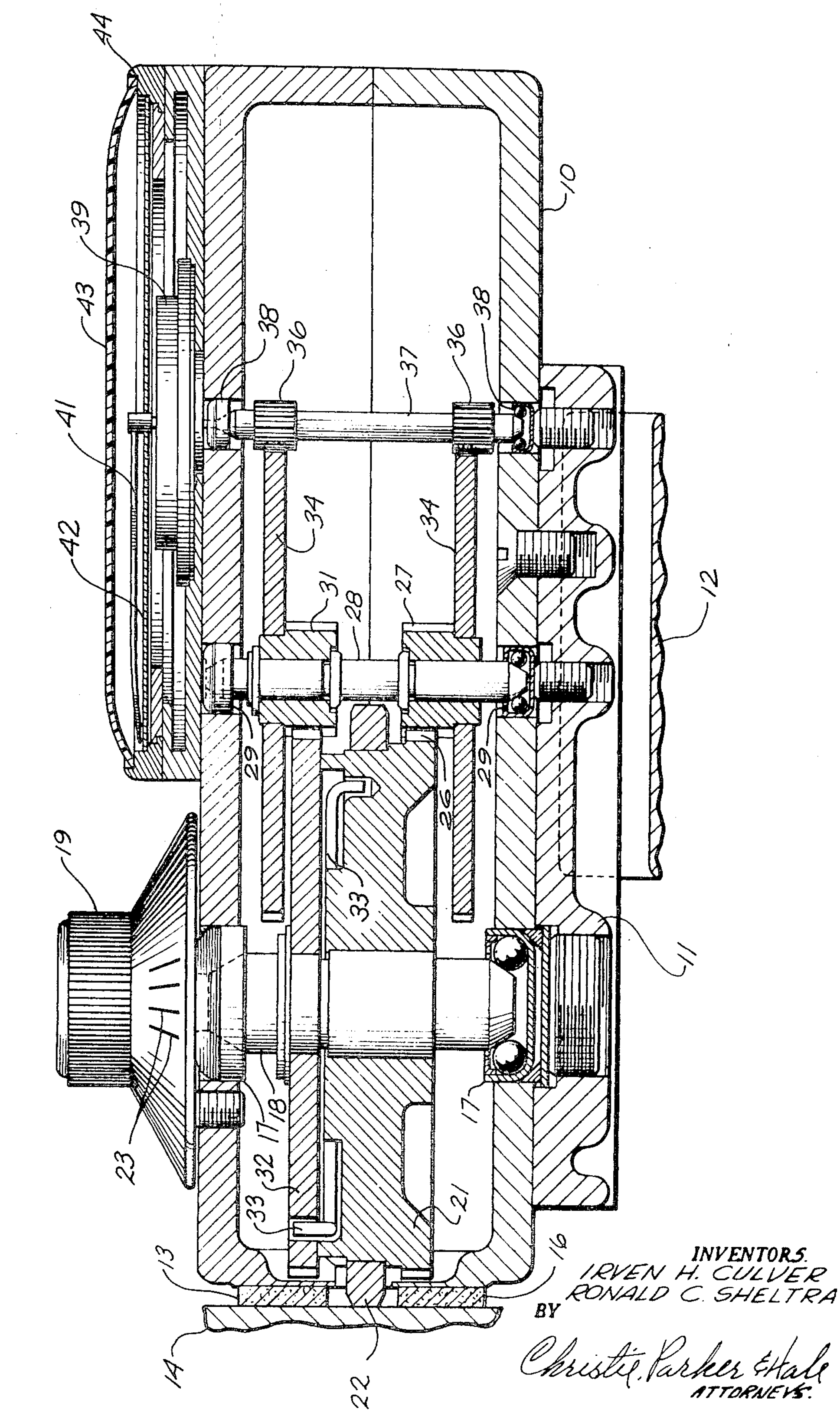
FIG. 1 illustrates in transverse cross section a distance-measuring instrument incorporating principles of this invention.

FIG. 1 illustrates in transverse cross section a friction wheel distance measurement instrument incorporating principles of this invention. As illustrated in this embodiment, there is a hollow housing 10 to the lower side of which is secured a dovetail connecting plate 11. The connecting plate is preferably engaged with a mounting block 12 such as described in the aforementioned U.S. Pat. No. 3,378,929. The mounting block 12 is secured to the carriage of a lathe, for example, (not shown). The measuring instrument is mounted so that an end face 13 of the housing 10 is adjacent and urged towards a measurement surface 14 such as a portion of the guideway of a lathe, for example. A piece of felt 16 or the like may be provided between the face 13 and the measurement face 14 to prevent chips and other debris from entering the measurement instrument.

A lathe is referred to herein merely for the purposes of explanation and example. It will be readily apparent that the measuring instrument may be used on substantially any machine tool such as a planer, shaper, drill press, milling machine, or the like. The instrument may be used in substantially any case where relative motion between two adjacent elements must be measured with precision and accuracy.

A pair of opposed thrust bearings 17 in the housing 10 support a shaft 18 on one end of which is a knob 19. The shaft 18 also supports a metering wheel 21 on which is mounted a peripheral ring 22 having a precise circumference. A portion of the edge of the ring 22 protrudes from an opening in the end 13 of the housing 10 and is in frictional engagement with the measurement surface 14 so that as the measuring instrument moves along the surface (into and out of the plane of the paper of FIG. 1) the ring 22 and thence metering wheel 21 rotate and drive the shaft 18. Since the ring 22 has precisely known circumference, for example 6 inches, each revolution of the ring represents a travel of that distance by the measuring instrument along the measurement surface 14.

As the ring 22, wheel 21 and shaft 18 rotate, the knob 19 is also rotated. Measurement indicia 23 on the knob 19 can be compared with related indicia (not shown) on the top of the housing so that the operator can observe the extent of rotation of the knob and, hence, the distance traveled along the measurement surface 14. Since the knob 19 is coupled directly to the ring 22 it rotates but once for each revolution of the ring and, hence, provides only a relatively coarse measurement of distance traveled. If desired, the knob can be frictionally mounted on the shaft 18 so that it is reliably rotated by the shaft 18 and yet can be manually rotated to adjust the reading when the ring 22 is in tight engagement with a measurement surface 14. This enables an operator to set a zero reading on the knob, if desired.

A larger pitch diameter gear face 26 on the metering wheel 21 engages a relatively smaller pitch diameter spur or pinion gear 27 which is mounted on a shaft 28 supported on a pair of opposed thrust bearings 29 in the housing 10. A second relatively smaller diameter spur gear 31 is also mounted on the shaft 28 and is driven by a relatively larger diameter spur gear 32 which is mounted on the same shaft 18 as the metering wheel 21. The second spur gear 32 has a pitch diameter the same as the pitch diameter of the gear face 26 on the metering wheel 21. The second large spur gear 32 and at least one of the smaller spur gears 27 and 31 are free to rotate on their respective mounting shafts. A torsion spring 33 biases the metering wheel 21 and spur gear 32 apart to prevent backlash throughout the gear train in the conventional manner.

Larger diameter spur gears 34 are fixed on each of the smaller diameter spur gears 27 and 31 so as to rotate therewith. The larger spur gears 34 are in engagement with relatively smaller spur gears 36 which are fixed on a shaft 37 mounted on a pair of Bearings 38 in the housing 10. The shaft 37 extends through a photoelectric chopper 39, described in detail hereinafter, and has an indicator needle 41 mounted on the end. The needle 41 is adjacent a dial face 42 which bears indicia (not shown) for indicating needle position. A transparent cover glass 43 preferably made of plastic covers the dial face to protect the needle 41 and is held in place by a bezel 44 connected to the main housing 10.

The antibacklash gear train of gears 26 and 32 meshing with gears 27 and 31, respectively, and gears 34 meshing with gears 36 provides a motion amplification which, for example, may be 60:1 from the primary shaft 18 to the final shaft 37 on the end of which is mounted the needle 41. Thus, the needle 41 makes one complete revolution for every 1/60th revolution of the primary shaft 18. With a 6-inch diameter metering ring 22, the needle 41 would make 1 revolution every 0.1 inch of travel along a surface, for example. With such a motion amplification, indicia on the dial face 42 indicating a travel of 0.001 inch by the ring 22 along a measurement surface 14 can readily be provided. It will be apparent to one skilled in the art that other gear ratios, metering-wheel diameters, and a dial face indicia can be provided for greater or less precision in measurement or for providing measurements in metric units, if desired.

Metering-wheel measuring instruments in accord with the foregoing description are now commercially available and are embodied in Trav-A-Dial instruments manufactured by Southwestern Industries, Inc., Los Angeles, Calif. In the commercially available instrument, the bezel 44, dial face 42 and needle 41 are immediately adjacent the upper surface of the housing 10 rather then displaced therefrom as great a distance as illustrated herein. In the improved measuring instrument herein described, the final shaft 37 is elongated as compared with the commercially available Trav-A-Dial instrument for operation of a photoelectric chopper 39 below the dial face as hereinafter described in greater detail.

Because the measuring instrument relies solely upon frictional engagement of the ring 22 with the measurement surface 14 to monitor travel of the instrument along the measurement surface, and because any slippage of the metering wheel relative to the measurement surface would be productive of an erroneous reading from the instrument, the polar moments of inertia of the moving elements in the instrument should be absolutely minimized. The severity of this requirement becomes apparent when it is recognized that the inertia of each rotary element in the mechanism, as manifested at the metering wheel, is magnified by the square of the amplification factor (gear ratio) between it and the metering wheel. Thus, any rotating element on the final shaft 37 should have as low a polar moment of inertia as possible. The photoelectric chopper 39 hereinafter described in a uniquely successful means for measuring shaft rotation without substantial effect upon polar moment of inertia or frictional engagement of the ring 22 with a measurement surface.

In a preferred embodiment, the photoelectric chopper is employed as a shaft position encoder that electronically senses rotation of the shaft, both in direction and magnitude, so that electrical signals are provided indicative of motion of the instrument along a measurement surface. In a preferred embodiment signals indicative of 0.0001 inch of travel of the housing 10 relative to the measurement surface 14 are readily provided from the chopper. It should be understood that signals indicative of greater or smaller increments of travel may be employed as desired for other applications of the measuring instrument.

Figure 2:
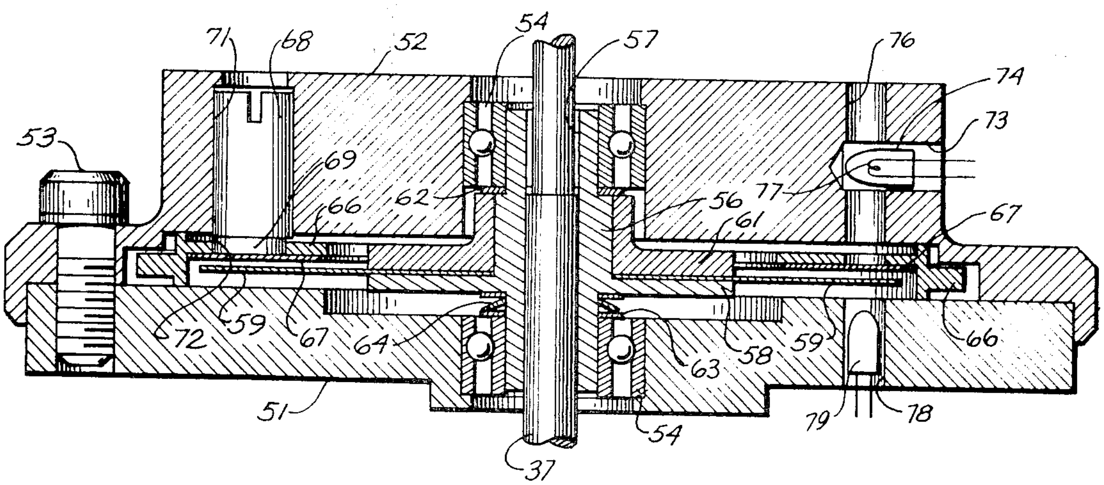
FIG. 2 is an enlarged transverse cross section of a portion of the instrument of FIG. 1 including a photoelectric chopper.
Figure 3:
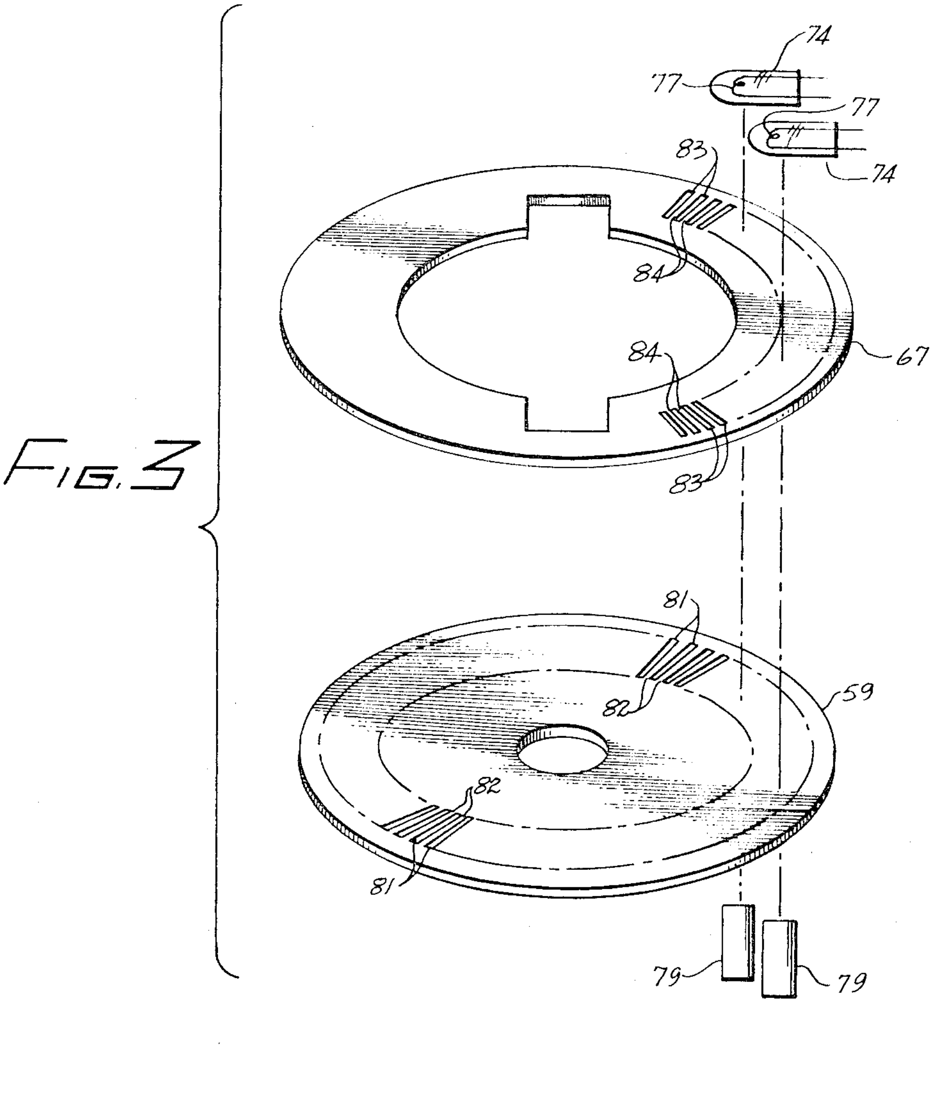
FIG. 3 is an exploded perspective of a portion of the photoelectric chopper.
Figure 4:
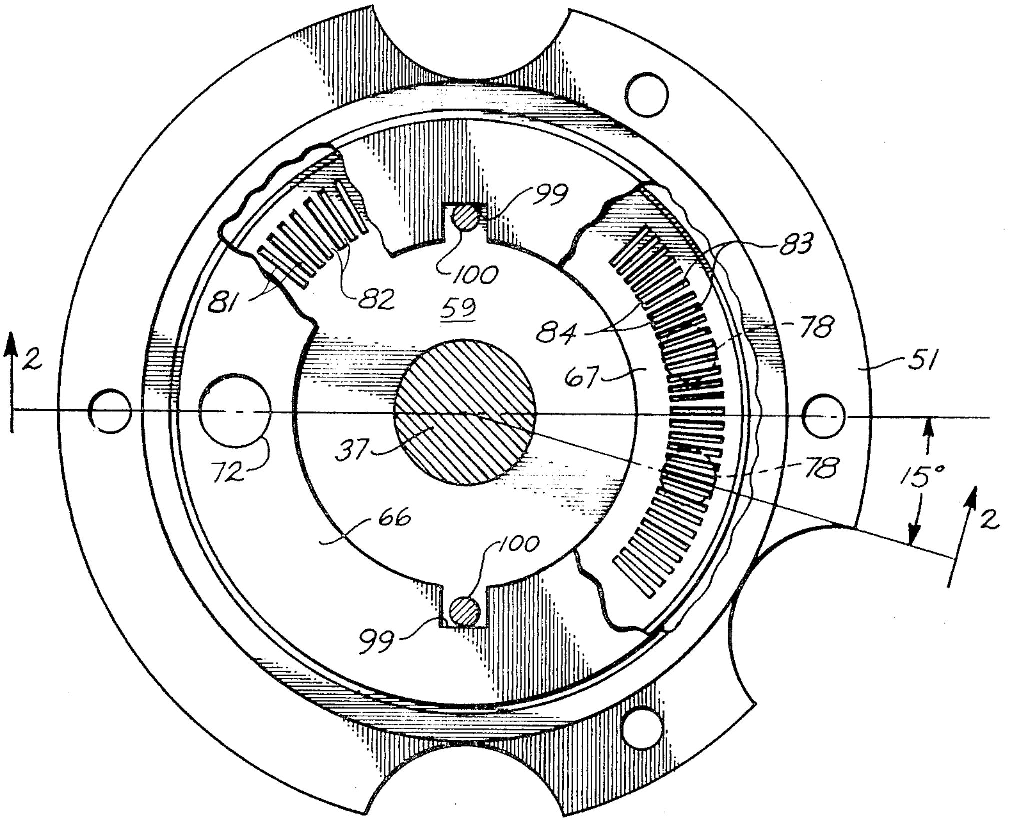
FIG. 4 is a top cutaway view of the photoelectric chopper.

FIGS. 2, 3 and 4 illustrate in greater detail a photoelectric chopper 39 incorporating principles of this invention. FIG. 2 is a transverse cross section of the chopper taken along the line 2—2 seen in the partially cutaway plan view of FIG. 4. FIG. 3 is a schematic view illustrating certain elements of the photoelectric chopper.

As is best seen in FIG. 2, the chopper comprises a lower housing 51 to which is bolted an upper housing 52 by at least three bolts 53 near the periphery (only one of which is shown). The lower housing 51 is preferably connected to the housing 10 of the measurement instrument by a somewhat resilient material such as conventional RTV or other elastomeric material, so that it is properly damped against accelerations to avoid putting an undue load on the several bearings on the shaft 37. A pair of bearings 54 support a sleeve 56 in the upper and lower housings 52 and 51, respectively. The final shaft 37 on which the needle 41 (FIG. 1) is supported passes through the sleeve 56, which includes a short star-shaped internal portion 57 which engages the shaft 37 when the sleeve 56 is pressed thereon to prevent relative rotation. A radial flange 58 on the sleeve 56 supports a thin plastic disk 59 which is held in place by a collar 61 pressed tightly onto the external portion of the sleeve 56. Thus, as the shaft 37 rotates, the sleeve 56 rotates, thereby causing rotation of the disk 59.

A circular shim or washer 62 is provided between the upper bearing 54 and the collar 61, and a second shim or washer 63 is provided between the lower bearing 54 and a wave washer 64. The wave washer 64 (or Belleville spring, if preferred) biases the sleeve 56 against the upper shim 62 so as to hold the disk 59 in a carefully preselected position.

A ring 66 is mounted between the lower housing half 51 and the upper housing 52, so that when the bolts 53 are tightened the ring is tightly clamped in position. A mask 67, described in detail hereinafter, is cemented to the ring 66. A pin 68 having an eccentric cam 69 on one end is mounted in a hole 71 in the upper housing 52. The eccentric cam 69 engages a hole 72 in the ring 66 for adjustment of the mask as hereinafter described in greater detail.

A pair of radial holes 73 (one of which is seen in FIG. 2) in the upper housing 52 each holds a tiny conventional light bulb 74. A passage 76 through the upper housing intersects the radial hole 73 for passage of light therefrom. The filament 77 of the light bulb is preferably oriented so as to have its greatest extent parallel to the axis of the passage 76.

A pair of openings 78 (one of which is seen in FIG. 2) in the lower housing 51 each holds a conventional photodiode 79 or other conventional light sensor. The photodiodes 79 are aligned with the light bulbs 74, as seen in FIG. 3, so that light from each bulb 74 passes through a portion of the mask 67 and a portion of the disk 59 en route to the respective photodiode 79.

As is most clearly seen in FIG. 3, the disk 59 has a plurality of radially extending windows 81 in a circular path near the periphery. Between the windows 81 are opaque areas 82. The sides of the windows 81 and opaque areas 82 are on radial lines from the center of the disk so that both windows and opaque areas are cuneiform or wedge-shaped. In a preferred embodiment, the disk 59 comprises a thin sheet of polyethylene terephthalate (Mylar) or the like on which is an opaque layer applied by printing or photographically. The disk is thus transparent in the area of the windows 81 and opaque in other areas where the coating is applied. If desired, the disk can be made by piercing or etching windows in in a thin metal sheet. Such an encoder disk may typically be about 1 inch in diameter so that it and the small supporting sleeve 56 have a very small polar moment of inertia, and their contribution to the effective inertia of the metering wheel is quite small in spite of the gear ratio between the mounting shaft 37 and the metering wheel.

The mask 67 is similar to the disk 59 in having a plurality of radially extending windows 83 alternating with a plurality of opaque areas 84 therebetween. The mask can readily be made in the same manner as the disk. The mask differs from the disk in the number of windows per unit length or arc and window as hereinafter pointed out in greater detail and also, in that the windows 83 on the mask need extend only over a limited arc so as to be in the path of light between the bulbs 74 and the photodiodes 79. This is the case since the mask is cemented to the ring 66 (FIG. 2) and, hence, fixed in the housing relative to the lamps and photodetectors while the disk may rotate and, hence, has windows 81 in complete circle.

The width of the windows and opaque areas on the mask and disk are selected, as hereinafter pointed out, so that when the disk is rotated to a first position an opaque area 84 on the mask obscures light passage through a window 81 in the disk, and an opaque area 82 on the disk obscures light passage through a window 83 in the mask. That is, when the disk and mask are so aligned no light can pass through the combination; that is, from a bulb 74 to a photodiode 79. When the disk is rotated 1 window width from the previously mentioned position, a window 81 in the disk is aligned with a window 83 in the mask, and the opaque areas 82 and 84, respectively, on the disk and mask are aligned. This permits a maximum amount of light to pass between the bulb and photodiode.

It should be apparent that when the disk rotates, a substantially sinusoidal variation in light intensity occurs as the windows move from light-passing alignment, through obscuring by an opaque area, and back to light-passing alignment at the next window. It should also be noted that during this amount of rotation, one full-wave electrical signal corresponding to light intensity is provided by the photodiode. Thus, for example, if 250 such windows 81 and 250 such opaque areas 82 are provided around the circle on the disk, 250 full-wave signals will occur for 1 full revolution of the disk, that is, of the shaft 37 on which the disk is mounted. In the exemplary embodiment with a 6-inch circumference measuring ring 22 and 60:1 gear reduction and 250 windows around the periphery of the disk, 2,500 full-wave signals are provided in each photodiode for each inch of travel of the measuring instrument along a measuring surface. Each full-wave signal passes through a reference level (e.g. a selected bias voltage) twice during each cycle and therefore two pulses can readily be provided in an output circuit. By adjusting the phase relation of the two signals from the two photosensors, the number of pulses is again doubled and 10,000 pulses are generated for each inch of travel. Additional photosensors can be provided by windows in proper phase relation so that greater sensitivity can be obtained if desired.

To this point, the discussion of the interaction between the windows and opaque areas has proceeded as if a single window and single opaque area on each of the mask and disk were interacting. In actual practice, it is preferred to interact a plurality of windows and opaque areas on the mask with a plurality of windows and opaque areas on the disk. This is preferred since the output response of the photodiode is dependent on absolute light intensity, and when the windows are quite narrow the quantity of light reaching the photodiode may be too low for optimum operation. Relatively wide windows to permit more light to reach the photodiode would therefore appear desirable. On the other hand, in order to obtain a high sensitivity to shaft angular position, the chopper should have a large number of windows of small angle, and in order to obtain a large number of windows in a circle on a small diameter disk they must be narrow.

Both of these contradictory requirements are satisfied when a plurality of narrow windows in both the disk and mask are employed in the field of view of each photodiode, that is, in the path between the bulb and the photodiode. Thus, when properly aligned, a plurality of windows 81 and opaque areas 82 in the disk interact with a plurality of windows 83 and opaque areas 84 in the mask in the same manner as an individual set of windows and opaque areas. In this manner, sufficient light is passed through a plurality of windows adjacent a photodetector to obtain a high response, and the light intensity oscillates 1 full cycle each time the disk rotates a distance between one window and the next so that no angular sensitivity is sacrificed.

If a collimated light source were employed in a mask-and-disk arrangement, as hereinabove described, the width of the transparent and opaque areas on the disk and on the mask can be equal and the same number of windows per inch (or per angle of arc at a selected radius) can be employed on both the disk and the mask. It is, however, somewhat difficult to obtain collimated light from a practical light source, particularly when the optical path must be very short in order to maintain small instrument sizes. If the light is not collimated, there is divergence (or convergence) of the light rays so that uniform arrays of windows and opaque areas on the disk and mask would need to be in substantially the same plane in order to obtain proper interaction of the windows and opaque areas, that is, complete opening and closing of the windows.

Clearly, having the windows on the disk and on the mask in the same plane is a practical impossibility; and even if located in very close proximity, a significant difficulty is encountered in an actual instrument since rubbing could occur between the moving disk and stationary mask which contributes substantial friction forces which are magnified by the gear ratio and may cause slippage between the measuring instrument and the measurement surface. Rubbing of the disk and mask also causes considerable wear of these elements and quickly would damage the small size opaque areas and windows so that proper chopping of the light could not be obtained.

Thus, in practice of this invention according to a preferred embodiment there is provided a simple means for obtaining good light chopping with a noncollimated light source. Such an arrangement is illustrated schematically in FIG. 5 wherein the mask 67 is fixed to the ring 66 in front of a light bulb 74. The disk 59 is parallel to the mask 67 and spaced from the mask by a distance B. A photodiode 79 is positioned on the opposite side of the mask and disk from the light bulb 74 so that any light therefrom must pass through both the mask and disk before reaching the photodiode. The filament 77 of the light bulb 74 is illustrated schematically as a rectangle in FIG. 5. As mentioned hereinabove, the greatest linear extent of the filament 77 should be in a direction parallel to the axis of the passage 76 through the housing, that is, normal to the plane of the mask. When so positioned, the filament can be considered to have an effective center spaced from the mask by a distance A. The spacing of the photodiode 79 behind the disk is not critical; however, it is preferably as short a distance as possible in order to minimize light losses in the system.

Figure 5:
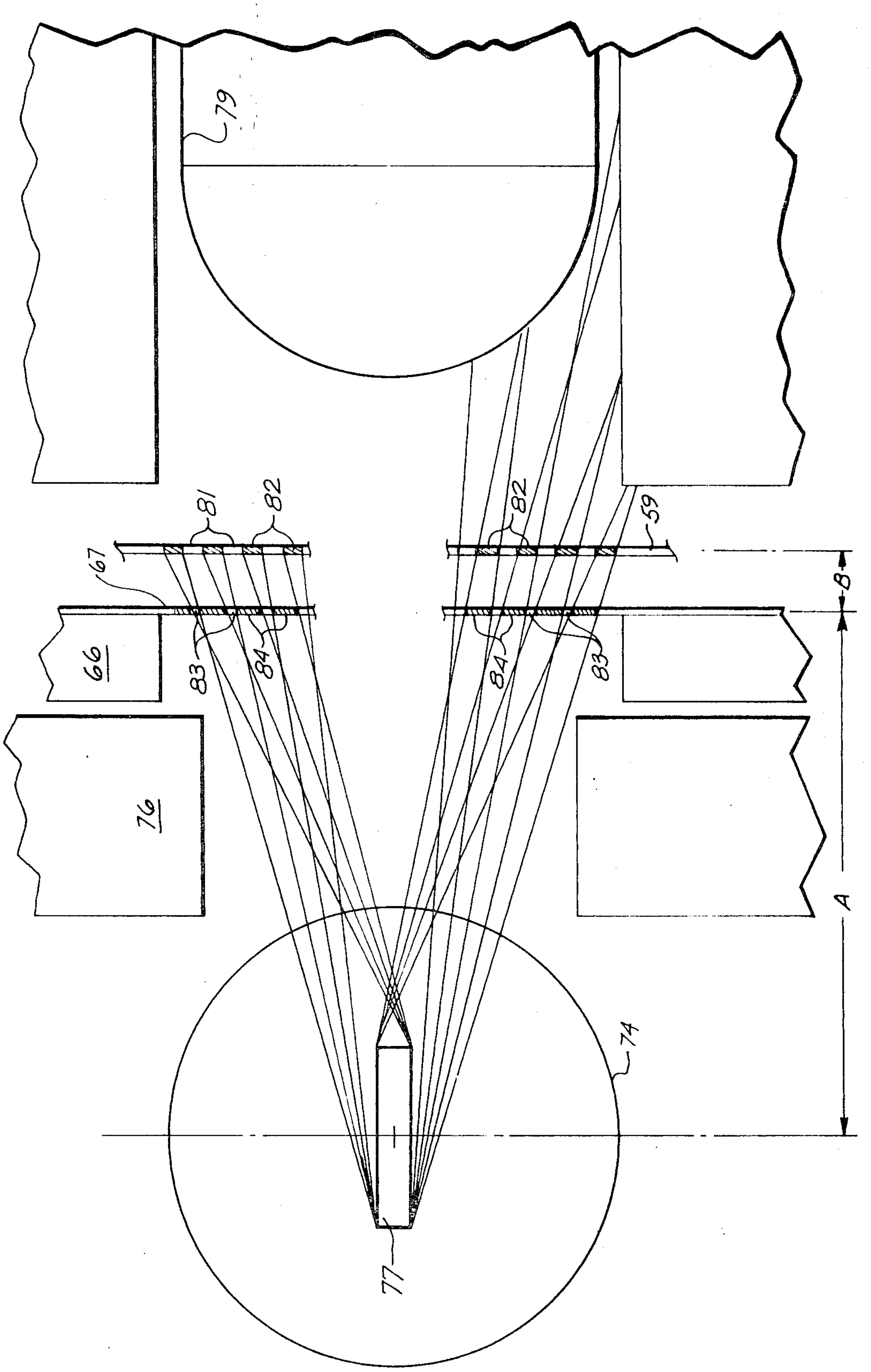
FIG. 5 is a side schematic of a portion of the photoelectric chopper.

The filament 77 of the light source can be thought of as a rectangle, as illustrated in FIG. 5, for purposes of determining the window geometry, and no significant difference will be noted when an actual filament is employed. Since the light from the filament 77 is diverging, the number (M) of the windows 83 per unit length in the mask is greater than the number (N) of windows 81 per unit length in the disk. This occurs since the angle subtended by the diverging rays is constant and the distance from the source increases so that the same number of windows at the greater distance from the light source is spread over a greater linear extent.

The number of transparent areas required is determined by the formula $M=N([B/A]+1)$ where $M$ is the number of windows per unit length or unit arc in the nearer mask, $N$ is the number of windows per unit length or unit arc in the further disk, $B$ is the spacing between the mask and the disk, and $A$ is the spacing between the nearer mask and the effective center of the filament of the light bulb.

It is preferred in making a structure of this sort to have the width of the transparent windows 81 in the disk equal to the width of the opaque areas 82 therebetween. (It will be noted that the windows and opaque areas in the schematic illustration of FIG. 5 are viewed transverse to their greatest linear extent, that is, as if the schematic section of FIG. 5 were taken along a circumference through the windows. It will also be apparent that although the terminology "width" is employed for the slits that it actually refers to the angular width since the windows and opaque areas are wedge-shaped.) By making the width of windows and opaque areas equal it will be seen that 50 percent of the light passes freely through the windows and 50 percent is obscured by the opaque areas of the disk.

Ray paths can then be drawn from the edges of the windows in the disk to the extreme edges of the light-producing filament 77. It should be noted that in the schematic drawing of FIG. 5 two separate disk positions are illustrated. In the upper portion the disk is positioned so that the opaque areas 82 in the disk are aligned with windows 83 in the mask and the opaque areas 84 on the mask are aligned with the windows 81 in the disk so that all light is blocked. In the lower portion of FIG. 5 windows 81 in the disk are aligned with windows 83 in the mask and the respective opaque areas 82 and 84 are aligned so that maximum light is transmitted through the windows. It is preferable in drawing the ray traces to follow the rays transmitted through the windows in both the disk and mask, and it is found that such tracing is effective for defining the geometry of the windows in the mask.

Thus, as illustrated in the ray traces in the lower portion of FIG. 5, a trace is drawn from the lowest edge of each window to the uppermost edge of the filament that can be seen from that point. Similarly, a trace is drawn from the upper edge of each window to the lowermost point on the filament that can be seen from that point. These two ray traces cross at some point between the disk and the filament.

Since it is possible for light to pass through the window 81 in the disk, only if it is between the ray traces so drawn, the corresponding window 83 in the mask need be only as wide as the distance between the ray traces at the plane of the mask. In the illustrated arrangement, the windows 83 in the mask are therefore narrower than the windows 81 in the disk. Consequently, the opaque areas 84 in the mask are wider than the opaque areas 82 in the disk. With this arrangement, all of the light passing through a window in the mask passes through a window in the disk when these windows are aligned as illustrated in the lower portion of FIG. 5.

When the disk is rotated (displaced in FIG. 5) by the width of one window (or one opaque area) a position is reached as illustrated in the upper portion of FIG. 5. In this case, the opaque area 82 in the disk obscures all of the light passing through the window 83 in the mask. Likewise, the opaque area 84 on the mask prevents any light from passing to the window 81 in the disk. Such is the case since the windows and opaque areas in the disk are of equal width so that there is symmetry in the full-open and full-closed positions. It should be apparent that because of the identity in width in the opaque and transparent areas of the disk that a symmetrical full-wave variation in light intensity passing through the windows will occur as the disk is rotated in front of the mask. This arrangement makes it possible to space the disk and mask apart so that they do not rub even though a noncollimated light source is used.

It might be noted that the ray trace technique for determining window size in the mask is somewhat of an approximation, and it would be exact if the filament as illustrated in FIG. 5 were circular. The mask and disk are in parallel planes normal to the length of a filament that has a greater length than width. Therefore, the apparent filament size on the effective surface of the photosensor is not the same in all positions. Near the edge of the photodiode the filament appears large and near the center it appears small. A close approximation of the best window width could be obtained if the width of each individual window in the mask were selected according to its position between the filament and photodiode. This is, however, a practical impossibility since the mask must be employed in an instrument wherein some variation in filament geometry will occur from one bulb to the next. It is also practical undesirability since it is desirable to manufacture masks wherein all of the windows have the same width irrespective of their position on the mask. It is found, however, that for practical size filaments and spacings that this ray trace technique gives a sufficiently accurate approximation of mask window size to give excellent light chopping with a noncollimated light source.

It should also be noted that if the window sized were all exactly as defined by the ray traces that a near sinusoidal variation in light intensity would occur. This is a practical improbability, however, since processing variations in making the tiny windows in the mask and disk, and also minor errors in exact window size in the mask cause slight deviations from a smooth sinusoidal variation. It is found, however, that the light intensity waveform produced is quite symmetrical and is sufficiently close to sinusoidal that conventional electronic circuits handle the resultant signals from the photodiode in exactly the same manner as if the the signal were exactly sinusoidal. The exact waveform is not important and it is only of importance that it be nearly symmetrical and have gradual rather than instantaneous changes in light intensity so that adjustment of circuits for proper pulse forming is possible.

It should be noted that the relation for the number of windows per linear extent according to the formula $M=N([B/A]+1)$ can be extended beyond a case where there is a disk rotating relative to a mask, and is also applicable to an arrangement of two linear arrays of windows that may be movable in a linear direction relative to each other. It should also be noted that the position of mask and disk relative to the light source can be reversed with the nearer array of windows moving and the further array of windows being stationary. The response of the photosensor in either of these situations is substantially identical.

Optimum light transmission is obtained if the width of windows and the width of opaque regions is exactly equal in the array further from the light source. The windows are preferably relatively narrower and opaque areas relatively wider in the array nearer the light source, as illustrated in FIG. 5. In such an arrangement the maximum amount of light is transmitted through the aligned windows and the windows are just barely completely occulted when one array is shifted relative to the other. In any other arrangement less than 50 percent of the light falling on the array can pass through when the windows are aligned or the light is not completely blocked when the two arrays are shifted.

Although it is greatly preferred that the array of windows further from the light source have equal widths of windows and opaque areas, and the other array have relatively narrow transparent areas and relatively wide opaque area widths, an operable system can be provided where the window and opaque area widths are the same for both arrays, or arrays of windows can be provided wherein both have dissimilar widths for the windows and opaque areas. Some of these arrangements may provide usable photodiode output waveforms substantially different from sinusoidal and with much less than maximum light transmission. It is definitely preferred that the light intensity variation be approximately sinusoidal, and if not that it at least by symmetrical.

Since the wave output from the photodiode is symmetrical, it is not possible for a single photodiode to distinguish whether the disk is rotating clockwise or counterclockwise. So far as each individual photodetector is concerned, the light is merely going on and off, thereby providing a series of pulses, two for each full cycle (one for off and one for on). Therefore, in order to distinguish clockwise and counterclockwise rotation, a pair of photodiodes 79 and a light sources 74 are provided in the preferred embodiment. Between each set of light bulb and photodiode, there is a sector of mask and a sector of disk, each having a plurality of windows. The portion of mask and disk viewed by one photodiode is displaced around the circumference of the disk from the portion of mask and disk viewed by the other photodiode. In a preferred embodiment, the two photodiodes are spaced apart about the array of windows on the disk at an angle of about 30°; that is, there is an angle of about 15° between a line through the center of the disk and normal to the chord between the photodiodes, and a line running through the center of the disk and one of the photodiodes. There can be variation in this angular separation in other embodiments, but is is preferred that the angular separation between the photodiodes be relatively small so that precise adjustment of the relative positions of the windows can be made as hereinafter described in greater detail.

As mentioned hereinabove, the output of each of the photodiodes 79 is a symmetrical wave and, as pointed out hereinafter, when the chopper is in proper adjustment the signal waveforms from the two photodiodes are 90° out of phase, as illustrated in the electrical schematic of FIG. 6 so that direction sense can be determined. This type of connection where the two signals are 90° out of phase is conventionally known as a quadrature interconnection, and is commonly employed for direction sensing, for example.

Figure 6:
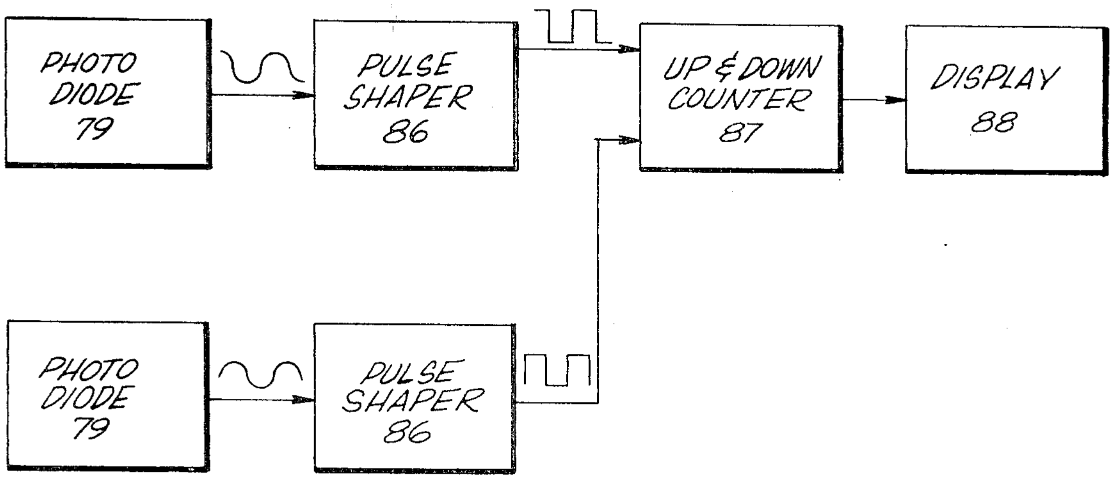
FIG. 6 is an electrical schematic of a portion of the photoelectric chopper.

As illustrated in FIG. 6, the approximately sinusoidal output of each of the photodiodes 79 is applied to a separate conventional pulse shaper 86. The pulse shaper converts the sine wave to a square wave and preferably the pulse shapers employed are each adjustable so that the relative ON and OFF times of each of the two square waves can be made substantially equal. Since the input sine waves to the pulse shapers 86 are out of phase by 90°, the square waves at the output of the pulse shapers are also 90° out of phase. The square pulses from the two pulse shapers are applied to a conventional up-and-down counter 87 which senses the phase relation of the square waves and counts the pulses either up or down as appropriate to keep track of the rotation of the disk and, hence, travel of the measuring instrument along a measuring surface.

The output of the up-and-down counter 87 is preferably applied to a conventional display device 88 which can be conveniently located for a machine operator. Any of a vast number of mechanical and electronic indicators can be employed as a display device; however, it is found that a conventional display of numeric display tubes or Nixie lights is quite readily understood under shop conditions. If desired, the counter output can also be applied to a recording instrument for a permanent record of measurements made.

As indicated above, each full wave from each photodetector provides two output pulses. These pulses are the switching ON and switching OFF of the square wave. The angular (or distance) resolution of the chopper is determined by the total number of such pulses per revolution, therefore the ON and OFF pulses from both photodetectors are counted. If greater angular resolution is desired without increasing the number of windows in the array, the number of photodetectors and lights can be increased with the phase relation properly arranged to further increase the number of pulses. Thus, for example, if three photodetectors are employed, they should be 60° to 120° out of phase to provide 50 percent more pulses than two photodetectors. The adjustment of the phase relation of the mask and disk window arrays becomes more difficult as more photodetectors are added.

Adjustment of the electronic pulse shapers 86 assures that the ON and OFF times of each of the square pulse trains are equal. This adjustment does not, however, shift the phase relation of the pulses in the two output signal lines, which is responsive to the phase relation of the input pulses to the shapers. Therefore, the phase relation is adjusted by mechanical positioning of the windows in the mask so that appropriate registry between the windows in the mask and in the disk is obtained before both photodiodes so that the two signal waves are in quadrature. Such adjustment in quadrature is obtained by translating the windows in the mask in a direction normal to the chord between the two photodiodes. At the same time translation is prevented in a direction normal to the direction of translation.

Figure 7:
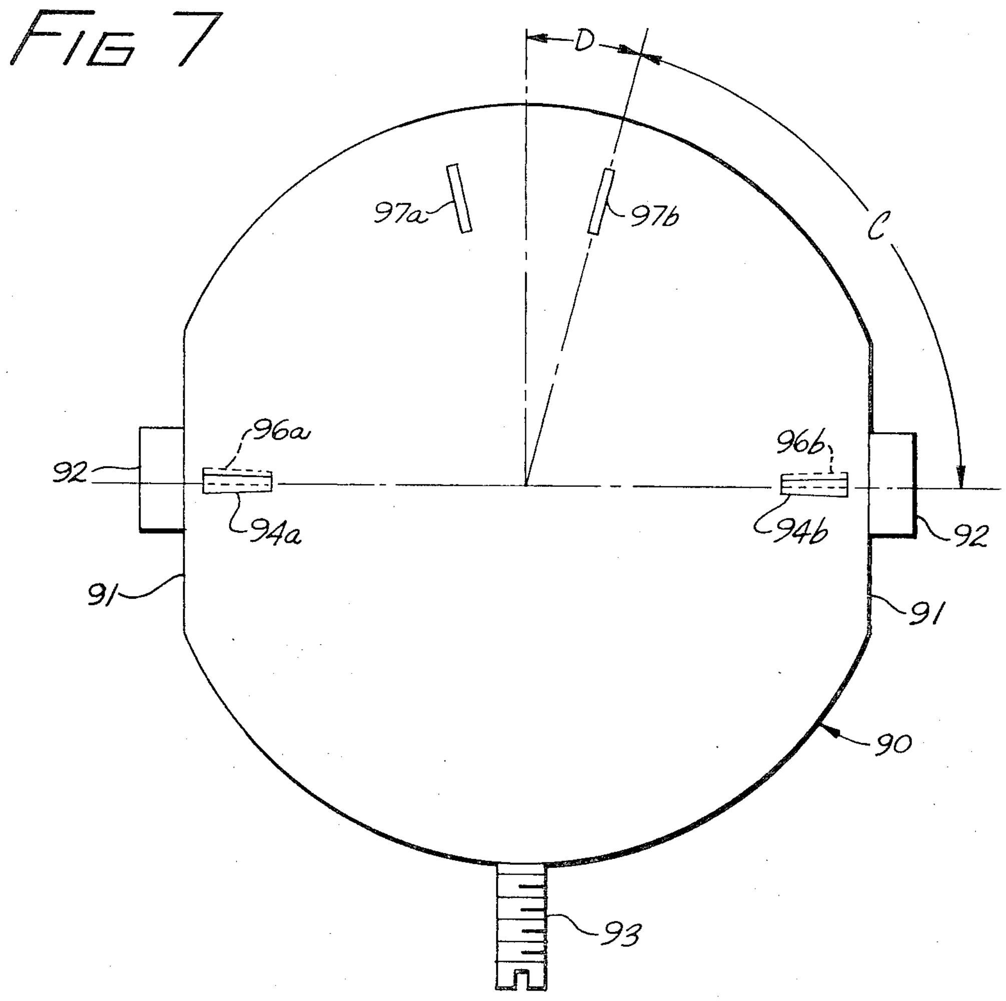
FIG. 7 is a schematic view of a portion of a photoelectric chopper for showing a means for adjusting.

The reason that such adjustment of the position of the windows in the mask relative to the position of the windows on the disk results in a phase change can be seen in the schematic illustration of FIG. 7. This drawing illustrates schematically a mask 90 that might be employed in a chopper of the same general type herein described, but simplified for purposes of exposition. A preferred arrangement is described hereinafter. The mask 90 has flats 91 on each side thereof which bear against guides 92 which prevent translation of the mask from side to side, but permit translation in a direction along the flats 91 as might be driven by a screw 93, for example.

For purposes of illustrating operation of the mask, windows **94*a* and 94*b* are illustrated on the centerline of the mask as radially extending slits substantially normal to the flats 91. Behind the mask a rotatable disk (not seen) would be employed and for purposes of illustration a pair of disk windows 96*a* and 96*b* are provided on the centerline in approximately the same location as the windows 94*a* and 94*b*, respectively. These disk windows 96 are displaced from the mask windows 94** as if the center of the disk were moved upwardly (in FIG. 7) by about one-half a window width.

If the disk hidden behind the mask 90 is rotated in a clockwise direction about its center when the windows **96*a*** and 96*b* are positioned as illustrated, it is apparent that light intensity through the pair of windows 94*a* and 96*a* is decreasing as the opaque areas progressively occult the windows, that is, the windows are no longer aligned. At the same time, the light intensity through the windows 94*b* and 96*b* is increasing since a larger area of window is continually being exposed. The window 94*a* and 96*a* are therefore out of phase from the windows 94*b* and 96*b*.

If the center of the mask is moved upwardly in FIG. 7 by movement of screw 93, for example, the windows 94*a* and 96*a* can be in exact registry at the same time that the windows 94*b* and 96*b* are in exact registry. When so aligned, the two sets of windows are in phase since, for example, as the disk rotates in a clockwise direction the light intensity through both sets will increase or decrease together.

It follows that, by adjusting the screw 93 and sliding the center of the mask relative to the center of the disk in a direction normal to a line between the windows, the phase relation of the two sets of windows can be adjusted to any desired value. Thus, for example, in order to shift the windows from a position where they are exactly in phase to a position where they are 90° out of phase would require the shifting of the mask a distance of one-half the width of the window.

If the width of the windows is very small a very precise adjustment of the mask position would be required in order to obtain a very precise phase relation if the windows were located on the diameter of the mask and disk, as illustrated in FIG. 7. In a typical embodiment the windows are about 0.005 inch wide and only 0.0025-inch movement shifts the phase a full 90°. Adjustment of phase relation to the desired precision would be difficult in a practical instrument. Therefore, in a preferred embodiment a pair of windows 97*a* and 97*b* are provided in the mask with a small angular separation (for example, 15°) from the direction in which the mask can be translated, that is, at a substantial angle C from the diameter on which the windows 94*a* and 94*b* are illustrated.

When the mask is shifted by adjusting the screw 93, the windows 97*a* and 97*b* are shifted relative to corresponding windows (not shown) in the disk underlying the mask in exactly the same manner that the sets of windows 94 and 96 were shifted in phase. When the windows 97 are in exact registry with windows in an underlying disk they are in phase, and when, for example, the mask is shifted downwardly in FIG. 7, the phase at one set of windows 97*a*, for example, will retreat while the phase at the other window 97*b* will advance.

The advantage of placing the windows 97*a* and 97*b* at a large angle C from the diameter of small angle D from the direction of translation is apparent when it is recognized that the distance that the mask must be shifted in order to shift the phase relation 90° is increased by a factor inversely proportional to the sine of the small angle D, as compared with the shift required for a pair of windows on the diameter. Thus, for example, if the angle D is about 15°, a phase shift of 90 electrical degrees requires four times the displacement of the windows 97*a* and 97*b* than it does the windows 94*a* and 94*b* on the diameter. Since a much greater translation is required to obtain the same phase shift, much more precision in obtaining two signals exactly 90° out of phase is possible.

Since the translation distance employed to get a selected phase shift is inversely proportional to the sine of the angle between the window and the translation direction, it is important to shift the windows in a direction where the angle from the translation direction is small and prevent shift in a direction where the angle is large. Thus, in FIG. 7, shifting is preferred in a direction along the diameter between the windows 97*a* and 97*b* since the angle D is in the order of 15°. With such an angle, motion of the ring and mask in a direction normal to the chord between the windows requires about four times the translation to obtain a selected phase shift than translation in a direction parallel to the chord. By preventing translation parallel to the chord, inadvertent changes in the phase relation are avoided. Viewed in another way, translation in the preferred direction permits adjustment of the phase relation with four times the precision available if the translation were in a direction normal thereto.

When the mask is free to translate in either direction, difficulty in obtaining a desired phase relation is noted for the added reason that skewing of the windows in the mask relative to the windows in the disk can occur. This is a particular problem since skewing destroys the symmetry of the waveform detected by the photodiodes. When symmetry of the waveform is lost, the slue rate that can be measured with precision drops off. Skewing also prevents the windows from reaching full-open and full-closed positions and thereby diminishes the difference between the OFF and ON light intensities.

If three windows and photodetectors are employed for greater angular sensitivity, it is preferred to place the third window on the line normal to the chord between the two windows 97*a* and 97*b* illustrated; that is, midway between the other two windows. Being so positioned, translation of the mask along the line through the window does not change its phase relation at all. The other two windows on either side are, however, shifted in phase in opposite directions and the phase relation of all three windows is readily set. The importance of preventing translation in a direction normal to the line through the middle window in such an arrangement is apparent.

There is an additional reason that it is desirable in a photoelectric chopper wherein two or more arrays of windows are viewed to have the sets of windows viewed in close angular separation rather than at opposite sides of the disk. The closer together the windows are, the less any accidental eccentricity in the disk or windows will affect the operation.

In the discussion of the schematic illustration of FIG. 7 the mask 90 is assumed to translate in a direction normal to a chord between the two windows 97*a* and 97*b* and is prevented from translating in a direction normal to that direction. It is also assumed that no rotation of the mask occurs. It should be apparent, however, that the disk rotates without changing the phase relation of the windows. It follows that rotation of the mask relative to the windows also will not affect the phase relations of the windows. Since this is true, a simple mechanism for alignment of the mask to obtain a desired phase relation can be provided.

FIG. 4 illustrates in partially cutaway plan view a mask 67 and a ring 66 for supporting the mask as provided in the embodiment of FIG. 2. The ring and mask are positioned over the disk 59 and lower housing 51. As pointed out hereinabove, the mask has windows 83 and opaque areas 84 overlying two spaced-apart apertures 78 in the lower housing through which light may pass from the pair of light bulbs to the pair of photodiodes (not shown in FIG. 4). The apertures 78 are each spaced about 15° from a diameter normal to the chord between the centers of the two apertures.

There is a hole 72 on the diameter midway between the apertures 98 and on the opposite side of the ring from the apertures. As pointed out in relation to FIG. 2, the hole 72 is engaged by an eccentric cam 69 (not shown in FIG. 4). The ring 66 is also provided with a pair of internally facing opposed flat areas 99 parallel to the diameter lying midway between the apertures 98. A pair of cylindrical pins 100 which are fixed to the upper housing 52 (not shown in FIG. 4) engage the two flats 99. The pins can be considered as cams and the flats as cam guides. This arrangement permits the center of the ring to translate in a direction along the diameter between the apertures 98 and prevents translation of the center of the ring in a direction normal thereto. The arrangement of flats 99 and pins 100 also permits limited rotation of the ring about its center.

Several possible variations will be noted in the cam and cam guide arrangement permitting translation in one direction and preventing translation in a direction normal thereto. Thus, for example, pins can be on the ring and flats on the housing, or in an embodiment where the disk shaft does not extend through the mask, a central pin can be employed in an elongated slot to obtain the same effect. When a pair of pins and flats are employed, it is preferred that they be spaced apart an appreciable distance so that rotation of the mask is permitted without likelihood of binding.

In order to move the ring, the pin 68 (FIG. 2) is rotated so that the eccentric cam 69 engages the hole 72 and causes that portion of the ring to move in a substantially circular path. Because of the restraint of the pins 100 and flats 99, this motion causes the center of the ring to translate in only one direction and also permits the ring to rotate about its center. This motion, as pointed out hereinabove in relation to FIG. 7, adjusts the phase relation of the windows 83 and opaque areas 84 in the mask relative to the windows 81 and opaque areas 82 in the disk in the two areas in front of the apertures 98. The phase relation is readily adjusted merely by loosening the bolts 53 (FIG. 2), turning the eccentric until the ring is in a position giving the desired phase relation and then retightening the bolts 53 holding the two housing halves together, thereby clamping the ring between the two housing halves and fixing it in position.

Figure 8:
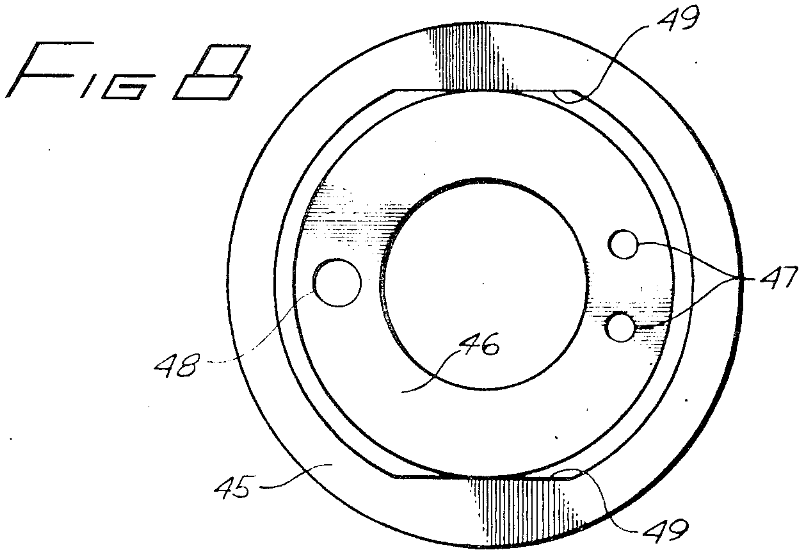
FIG. 8 shows another mask-mounting arrangement for providing ready adjustment.

A particularly advantageous arrangement for permitting translation in one direction and preventing it in a direction normal thereto and also permitting rotation of the mask is illustrated in FIG. 8. As illustrated therein a housing 45 has a circular ring 46 positioned therein for support of a mask (not shown) apertures 47 are provided to pass light through the ring in the same manner as hereinabove described. A hole 48 is provided for engagement by an eccentric. A pair of opposed flats 49 are provided on the inside of the housing 45 to provide a close fit against the outside of the ring 46. The flats on the housing permit the ring to move in a direction normal to a line between the apertures 47 and also permit rotation about the center of the ring. They prevent translation of the ring laterally and therefore provide the same effect as the pins operating on the ring hereinabove described in relation to FIG. 4. The mounting arrangement illustrated in FIG. 8 is advantageous in being simple to fabricate and assemble and also in providing large area support for the ring which can minimize the possibility of damage. The possibility of the ring binding as it rotates is also eliminated.

In order to adjust the photoelectric chopper, the disk 59 is rotated at any arbitrary velocity to generate signals from the photodiodes 79 which are coupled to the pulse shapers 86. The square waves from the pulse shapers may be displayed on an oscilloscope or the like and the two pulse shapers each adjusted in the conventional manner so that the ON and OFF times of each of the square waves is equal. Once this has been done, the eccentric cam 69 is rotated to shift the ring 66 and thereby move the windows of the mask until the desired phase relation between the two square waves is obtained. It is found that such an adjustment can readily be made with great accuracy in only a few minutes. If desired, instead of using an oscilloscope automatic instrumentation can be employed having greater phase sensitivity so that the ON and OFF times and the phase relation can be adjusted with greater precision than can be obtained by visual observation on an oscilloscope.

It is desirable in any instrument for measuring shaft position to be able to precisely record position when the rate of rotation is quite high. This rate of change of position in a rotating shaft is often known as the slue rate. It is found that when windows in a photoelectric chopper, as hereinabove described, are not in good alignment and precise phase relation, counting of pulses is not possible at very high slue rates. This may be due to nonsymmetries in the waveforms generated or minimal differences between light intensity in the ON and OFF positions of the windows. In any event, the limitation is in the precision of alignment possible with the windows rather than the electronic circuitry involved, which can handle much higher pulse rates than any of the mechanical limitations identified.

Thus, for example, in a distance-measuring instrument as provided in practice of this invention, the available slue rate is high enough to accommodate a travel at the rate of 60 inches per second along a measurement surface. Previously, it has been the practice to adjust the phase relation by shifting a mask with four screws so that translation in any direction could occur. This mode of adjustment was exceedingly tedious, sometimes requiring several hours to obtain the desired phase relation, and the precision was such that a slue rate limit prevented translation of the measuring instrument at a rate greater than about 18 inches per second along a measurement surface.

Although only one embodiment of a measurement instrument constructed according to principles of this invention has been described, many modifications and variations will be apparent to one skilled in the art. Thus, for example, other mechanisms for rotating the shaft on which the chopper disk is mounted may be employed. That is, the photoelectric chopper may be coupled to other shaft drives than the preferred distance-measuring instrument. Instead of employing the chopper as a measurement of shaft position, a linear arrangement of windows can be employed in some embodiments for measuring distance directly. It will also be apparent that the electric signals from the photoelectric chopper can be processed in many manners so that instead of shaft position the rotational velocity or acceleration can be provided as an output. Many variations and the mechanical details of mask-adjusting mechanisms and the like can readily be provided by one skilled in the art. Different arrangements of windows from the radially elongated cuneiform slits can be provided; such as, for example, windows in a checkerboard pattern with a plurality of photosensors, or, if desired, several concentric rings of windows can be provided in a disk with corresponding windows in a mask so that different angular sensitivities and available slue rates can be accommodated in a single shaft position measurement apparatus.

Another variation that may be employed is to position the windows in the mask differently in front of one photodetector than in front of the photodetector; that is, the array of windows in one sector of the mask are shifted circumferentially around the arc by a distance that would correspond to a phase shift of 90° in the light intensity wave. In this way, the two photodetectors are nearly 90° out of phase without any adjustment, and a camming arrangement can be employed for fine adjustment to obtain a precise phase relation.

What is claimed is:

1. Apparatus comprising:

a noncollimated light source;

a photodetector for receiving light from the light source;

a first mask having a plurality of transparent areas alternating with opaque areas, at least a portion of the transparent areas and opaque areas being interposed between the light source and the photodetector;

a second mask spaced apart from the first mask having a plurality of transparent areas alternating with a plurality of opaque areas, at least a portion of the transparent areas and opaque areas being interposed between the light source and the photodetector;

means for moving at least one of the masks relative to the other mask; wherein the number of transparent areas per unit length in the mask nearer the light source is different from the number of transparent areas per unit length in the mask further from the light source, the number of transparent areas per unit length on one mask being proportioned to the number of transparent areas on the other mask for simultaneously passing noncollimated light beams through a plurality of adjacent transparent areas on both masks, and wherein the extent of the transparent areas in the mask nearer the light source is different from the transparent areas in the mask further from the light source, such that upon relative movement of the two masks there is at least one cyclically repeatable position in which substantially all of the noncollimated light passed through the first mask will pass through the second.

2. Apparatus as defined in claim 1 wherein the extent of each transparent area in the mask nearer the light source is relatively less than the extent of the adjacent opaque area in the mask nearer the light source.

3. Apparatus as defined in claim 2 wherein the extent of each transparent area in the mask further from the light source equals the extent of each adjacent opaque area in the mask further from the light source.

4. Apparatus comprising:

a noncollimated light source;

a photodetector for receiving light from the light source;

a first mask having a plurality of transparent areas alternating with opaque areas, at least a portion of the transparent areas and opaque areas being interposed between the light source and the photodetector;

a second mask having a plurality of transparent areas alternating with a plurality of opaque areas, at least a portion of the transparent areas and opaque areas being interposed between the light source and the photodetector; and means for moving at least one of the masks relative to the other mask;

the number of transparent areas per unit length in the mask nearer the light source being greater than the number of transparent areas per unit length in the mask further from the light source;

the extent of each transparent area in the mask further from the light source equaling the extent of each adjacent opaque area in the mask further from the light source;

the extent of each transparent area being relatively narrower than the extent of each adjacent opaque area in the mask nearer the light source; and wherein the number of transparent areas M per unit length in the mask nearer the light source is determined by the formula $M=N([aB/A]+1)$ where $N$ is the number of transparent areas per unit length in the mask further from the light source, $A$ is the spacing between the effective center of the light source and the transparent areas in the mask nearer the light source, and $B$ is the spacing between the first and second masks.

5. A photoelectric chopper comprising:

a noncollimated light source;

a photodetector for receiving light from the light source;

a mask, said mask having a plurality of radially extending transparent areas alternating with a plurality of radially extending opaque areas, at least a portion of the transparent areas and opaque areas being interposed between the light source and the photodetector;

a disk spaced apart from the mask, said disk having a plurality of radially extending transparent areas alternating with a plurality of radially extending opaque areas, said transparent areas and opaque areas being arranged in a circular array on the disk and including a portion interposed between the light source and the photodetector; and means for mounting the disk for rotation in the plane of the disk; and wherein the number of transparent areas per unit arc length nearer the light source is greater than the number of transparent areas per unit arc length further from the light source, the number and the extent of transparent areas on the mask being proportioned to the number and the extent of transparent areas on the disk for simultaneously passing diverging light beams through a plurality of adjacent transparent areas on both the mask and the disk, such that upon relative movement of the two masks there is at least one cyclically repeatable position in which substantially all of the noncollimated light passed through the first mask will pass through the second mask.

6. A photoelectric chopper comprising:

a noncollimated light source;

a photodetector for receiving light from the light source;

a mask, said mask having a plurality of radially extending transparent areas alternating with a plurality of radially extending opaque areas, at least a portion of the transparent areas and opaque areas being interposed between the light source and the photodetector;

a disk, said disk having a plurality of radially extending transparent areas alternating with a plurality of radially extending opaque areas, said windows and opaque areas being arranged in a circular array on the disk and including a portion interposed between the light source and the photodetector; and means for mounting the disk for rotation in the plane of the disk; and wherein the number of transparent areas per unit arc length nearer the light source is greater than the number of transparent areas per unit arc length further from the light source, and the number of transparent areas M per unit arc length nearer the light source is determined by the formula $M=N([B/A]+1)$, where $N$ is the number of transparent areas per unit arc length further from the light source, $A$ is the spacing between the effective center of the light source and the nearer transparent areas, and $B$ is the spacing between the nearer transparent areas and the further transparent areas.

7. A photoelectric chopper as defined in claim 5 wherein:

the width of transparent areas equals the width of opaque areas in the array further from the light source; and wherein the width of the transparent areas is relatively less than the width of the opaque areas in the array nearer the light source.

8. A chopper as defined in claim 5 further comprising:

a second noncollimated light source;

a second photodetector, said light source and said photodetector being arranged on opposite sides of the mask and disk so as to view a second portion of transparent areas in the mask and disk remote from the first portion of transparent areas viewed by the first light source and first photodetector, for obtaining direction sense of rotation of the disk.

9. A chopper as defined in claim 8 wherein one-half of the angle separating the first and second portions of transparent areas viewed by the first and second photodetectors respectively is substantially less than the complement of one-half the angle.

10. A chopper as defined in claim 9, including means for moving the mask relative to the disk for adjusting phase relation of the first portions of transparent areas between the first light source and the first photodetector and the second portions of transparent areas between the second light source and the second photodetector.

11. A chopper as defined in claim 10 wherein the means for adjusting comprises:

means for translating the center of arc of transparent areas in the mask in a direction normal to a line between the first and second portions of transparent areas on the mask;

means for preventing translation of the center of arc of transparent areas in the mask in a direction normal to the direction of translation; and means for rotating the mask about the center of arc of transparent areas on the mask.

12. A chopper as defined in claim 10 wherein the means for adjusting comprises;

a pair of spaced-apart fixed pins on a line through the center of the disk and parallel to a line between the first and second photodetectors;

a pair of parallel flat areas connected to the mask and normal to the line between the pins, in guiding engagement with the pins; and an eccentric cam having a cam portion engaging the mask for effecting translation and limited rotation of the mask about the center of arc of transparent areas on the mask.

13. A chopper as defined in claim 10 wherein the means for adjusting comprises:

mounting means for the mask including a circular portion centered on the center of arc of transparent areas on the mask;

a pair of fixed-parallel flat areas in engagement with the circular portion; and means for translating the circular portion in a direction parallel to the flats.

14. A photoelectric chopper comprising:

a noncollimated light source;

a light detector displaced from the light source to receive light therefrom;

first and second masks interposed between the light source and the light detector, each of the masks having a plurality of opaque regions alternating with a plurality of transparent regions extending in a first direction along the masks;

means for providing relative motion of the first and second masks in the first direction;

the first mask being spaced from the effective center of the light source by a distance A;

the first and second masks being spaced apart by a distance B, the distance A plus B being greater than the distance B;

a greater number M of transparent areas per unit length on the first mask;

a lesser number N of transparent areas per unit length on the second mask; and wherein the number M of transparent areas per unit length on the first mask is determined by the formula $M=N([B/A]+1)$.

15. A chopper as defined in claim 14 wherein one mask is on a disk mounted for relative rotation and the other mask is mounted on a fixed housing, the transparent areas being arranged circumferentially on the disk and in a circular arc on the fixed mask, the number of transparent areas on one of the masks being greater per unit arc length than the number of transparent areas per unit arc length on the other mask.

16. A chopper as defined in claim 15 wherein the width of transparent regions on the second mask is equal to the width of the opaque areas on the second mask; and wherein the width of the transparent areas on the first mask is different from the width of the opaque areas on the first mask.

* * * * *

PO-1050
(5/69)

UNITED STATES PATENT OFFICE
CERTIFICATE OF CORRECTION

Patent No. 3,628,038 Dated December 14, 1971

Inventor(s) Irven H. Culver

It is certified that error appears in the above-identified patent and that said Letters Patent are hereby corrected as shown below:

Abstract - "movably" should be --moveable--.

Col. 3, line 33, "thence" should be --hence--;

Col. 3, line 34, insert --a-- before "precisely".

Col. 4, line 46, "in" should be --is--.

Col. 5, line 51, delete one "in";

Col. 5, line 70, insert --a-- before "complete".

Col. 6, line 20, insert --a-- before "60:1".

Col. 7, line 70, "in" should be --on--.

Col. 10, line 33, "to" should be --or--.

Col. 11, line 7, "window"should be --windows--;

Col. 11, line 48, "of" should be --or--.

Col. 14, line 37, insert --other-- before "photodetector"

Col. 15, line 5, "2" should be --1--.

Signed and sealed this 11th day of July 1972.

(SEAL)
Attest:

EDWARD M.FLETCHER,JR.
Attesting Officer

ROBERT GOTTSCHALK
Commissioner of Patents